United States Patent
Kure et al.

(10) Patent No.: US 6,733,659 B1
(45) Date of Patent: May 11, 2004

(54) REACTOR FOR HYDROTREATING AND PROCESS FOR PRODUCING ULTRALOW SULFUR HEAVY OILS BY THE USE OF THE REACTOR

(75) Inventors: Shigeo Kure, Yokohama (JP); Hajime Okazaki, Yokohama (JP); Hisao Sakoda, Yokohama (JP)

(73) Assignees: Nippon Mitsubishi Oil Corporation, Tokyo (JP); Petroleum Energy Center, Tokyo (JP)

( * ) Notice: Subject to any disclaimer, the term of this patent is extended or adjusted under 35 U.S.C. 154(b) by 47 days.

(21) Appl. No.: 09/740,969

(22) Filed: Dec. 21, 2000

Related U.S. Application Data

(63) Continuation of application No. 09/139,773, filed on Aug. 25, 1998, now abandoned.

(30) Foreign Application Priority Data

Aug. 29, 1997 (JP) .............................................. 9-249411

(51) Int. Cl.$^7$ ........................ C10G 65/02; C10G 45/02; B01J 8/04
(52) U.S. Cl. .................... 208/210; 208/213; 208/216 R; 208/216 PP; 208/217; 422/188; 422/189; 422/190; 422/191; 422/193
(58) Field of Search ................................ 208/210, 213, 208/216 R, 216 PP, 217; 422/188, 189, 190, 191, 193

(56) References Cited

U.S. PATENT DOCUMENTS

| | | | |
|---|---|---|---|
| 3,663,434 A | 5/1972 | Bridge | 208/210 |
| 3,696,027 A | 10/1972 | Bridge | 208/210 |
| 3,928,178 A | 12/1975 | Frye et al. | 208/210 |
| 4,054,508 A | 10/1977 | Milstein et al. | 208/89 |
| 4,306,964 A | 12/1981 | Angevine | 208/210 |
| 4,431,525 A * | 2/1984 | Hensley et al. | 208/210 |
| 4,431,526 A | 2/1984 | Simpson et al. | 208/211 |
| 4,657,663 A * | 4/1987 | Gardner et al. | 208/210 |
| 4,789,462 A | 12/1988 | Byrne et al. | 208/213 |
| 5,344,553 A | 9/1994 | Shih | 208/49 |
| 5,454,933 A * | 10/1995 | Savage et al. | 208/212 |
| 5,474,670 A | 12/1995 | Daage et al. | 208/210 |

* cited by examiner

Primary Examiner—Walter D. Griffin
(74) Attorney, Agent, or Firm—Kubovcik & Kubovcik

(57) ABSTRACT

An object is to provide a reactor for hydrotreating which exhibits a total desulfurizing activity higher than that of the reactor according to the prior art, and which is reduced in the rate of lowering of the desulfurizing activity and therefore can keep the high desulfurizing activity over a long period, and to provide a process by the use of the reactor. A reactor for hydrotreating, which comprises at least four catalyst layers packed respectively with hydrotreating catalysts satisfying the relationship represented by the following formulae: $S_n \leq S_{n+1}$, $1.15 V_n \geq V_{n+1}$ wherein S represents the surface area per cubic meter of each hydrotreating catalyst; V represents the pore volume per cubic meter of catalyst; and wherein n is a natural number representing the order of each catalyst layer.

21 Claims, 2 Drawing Sheets

REACTOR FOR HYDROTREATING AND PROCESS FOR PRODUCING ULTRALOW SULFUR HEAVY OILS BY THE USE OF THE REACTOR

This application is a continuation of application Ser. No. 09/139,773 filed Aug. 25, 1998, now abandoned.

BACKGROUND OF THE INVENTION

1. Technical Field

This invention relates to a reactor for hydrotreating which contains plural catalyst layers (catalyst beds) packed with hydrotreating catalysts respectively, and to a process for producing an ultralow sulfur heavy oil from a heavy oil containing sulfur compounds and metallic components by the use of the reactor.

2. Description of the Prior Art

There has been known a process which comprises using a fixed bed reactor packed with two kinds of hydrotreating catalysts, i.e., a demetallization catalyst and a desulfurization catalyst and bringing a heavy oil such as an atmospheric or vacuum distillation residue of a crude oil having high sulfur content into contact with the hydrotreating catalysts to thereby lower the sulfur content of the heavy oil, thus producing a low sulfur heavy oil for a long period. When a heavy oil having high sulfur content is used in the above process as the feed oil, however, the reactor is poor in total desulfurizing activity, so that the oil thus produced still has such high sulfur content as to be unsatisfactory in performance. Even when an atmospheric distillation residue having low sulfur content was used in the above process as the feed oil, there occurred the problem that the total desulfurizing activity of the reactor lowered too rapidly to operate the reactor for a long period, though an ultralow sulfur heavy oil could be temporarily produced in some cases by elevating the reaction temperature. Thus, the processes of the prior art had the disadvantage that the total desulfurizing activity of the reactor was too poor to produce an ultralow sulfur heavy oil over a long period.

SUMMARY OF THE INVENTION

An object of this invention is to provide a reactor for hydrotreating which contains plural catalyst layers packed with hydrotreating catalysts respectively and which exhibits a total desulfurizing activity higher than that of the reactor according to the prior art, which is reduced in the rate of lowering of the desulfurizing activity and therefore can keep the high desulfurizing activity over a long period, and to provide a process for producing an ultralow sulfur heavy oil from a heavy oil containing sulfur compounds, metallic components by the use of the reactor.

The inventors of this invention have intensively studied for the purpose of solving the above problems, and as a result of the studies, they have found that a reactor for hydrotreating which contains plural hydrotreating catalyst layers having specific relationship to each other exhibits a total desulfurizing activity higher than that of the reactor of the prior art and that the high total desulfurizing activity of the reactor of this invention is so slowly lowered as to be kept at a high level over a long period. This invention has been accomplished on the basis of these findings.

Namely, this invention provides a reactor for hydrotreating, which comprises at least four catalyst layers packed respectively with hydrotreating catalysts satisfying the relationship represented by the following formulae:

$$S_n \leq S_{n+1} \quad (1)$$

$$1.15 V_n \geq V_{n+1} \quad (2)$$

wherein S represents the surface area per cubic meter of each hydrotreating catalyst; V represents the pore volume per cubic meter of catalyst; and wherein n is a natural number representing the order of each catalyst layer.

Further, this invention also provides a process for producing an ultralow sulfur heavy oil, which comprises using the reactor for hydrotreating of this invention, and passing a heavy oil through the first to the last catalyst layers successively to thereby bring the heavy oil into contact with hydrogen gas under hydrogenation conditions in each catalyst layer.

DESCRIPTION OF THE PREFERRED EMBODIMENTS

This invention will now be described in detail.

Figure 2:
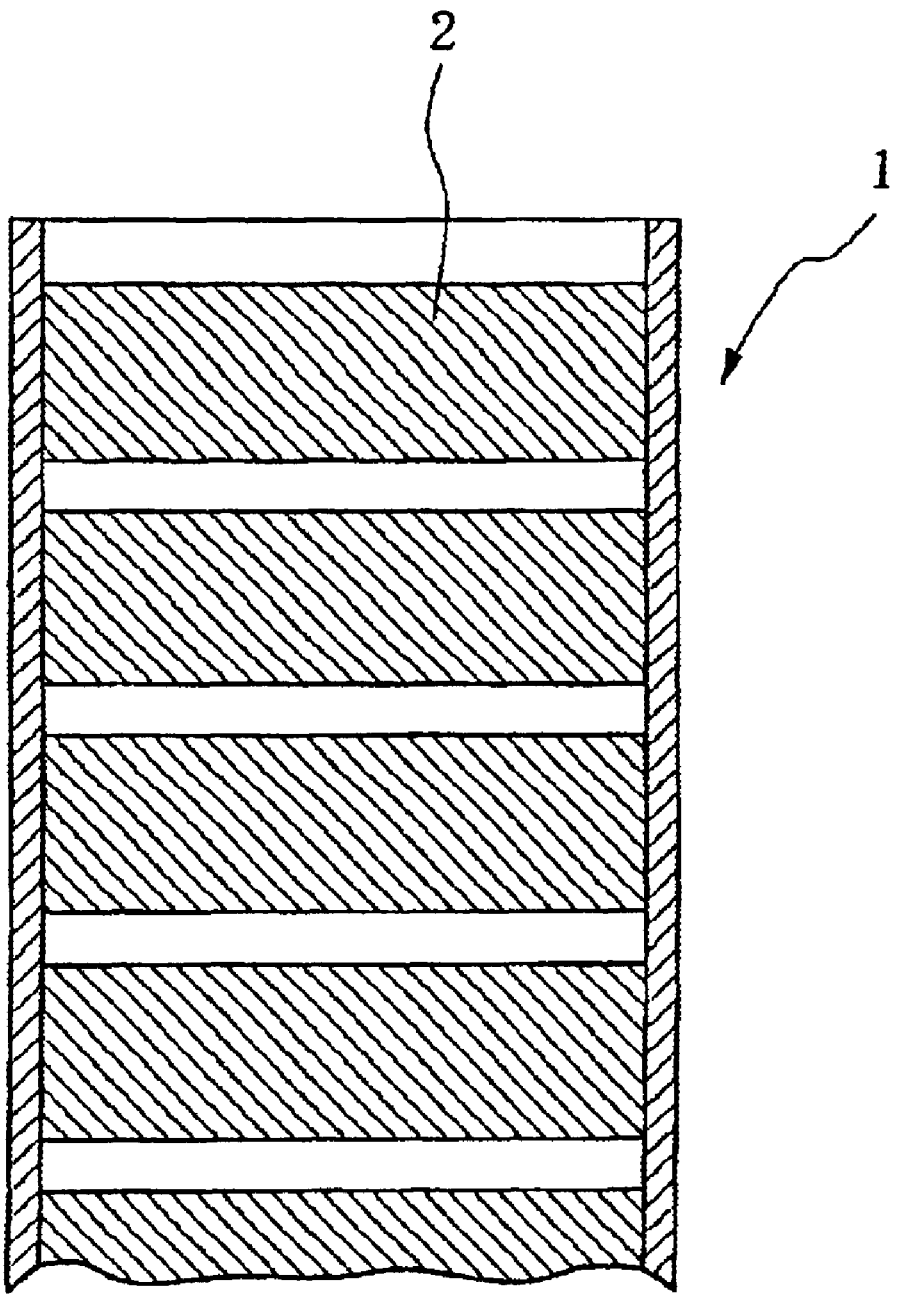
FIG. 2 is one example of a schematic cross-sectional view of the reactor for hydrotreating according to this invention.

In FIG. 2, the numeral 1 shows the reactor for hydrotreating according to this invention, and the numeral 2 shows a catalyst layer.

When a heavy oil is brought into contact with a hydrotreating catalyst, desulfurization occurs to thereby remove sulfur from the organosulfur compounds contained in the heavy oil, such as benzothiophenes, dibenzothiophenes, mercaptans, thio ethers and dithio ethers. In addition to the desulfurization, also demetallization, cracking and nitrogen removal occur simultaneously, the demetallization being effective in freeing the heavy oil of metallic components such as nickel, vanadium, iron and sodium. These reactions occur on the surfaces in the pores of a porous inorganic composite oxide used as a hydrotreating catalyst or on the outer surface of the oxide.

As these reactions proceed, however, coke and metals are formed secondarily and deposit in the pores of the hydrotreating catalyst and/or on the outer surface thereof. These deposits poison the active sites on the hydrotreating catalyst, which lowers the activities of the catalyst for desulfurization and so on. Further, the deposits formed in the pores of the catalyst clog the pores to lower the activities. A hydrotreating catalyst exhibiting the higher demetallizing activity gives a larger quantity of metals deposited, which is causative of lowering the catalytic activities.

In general, laminates of two kinds of catalysts, i.e., a demetallization catalyst and a desulfurization catalyst, are used as desulfurization catalysts for heavy oils. After such catalysts were used for one year, they were withdrawn from the reactors and examined for the quantities of metals and coke deposited. The quantity of metals deposited was largest near the inlet of the reactor and became smaller toward the outlet thereof. That is, it has been found that the catalyst near the inlet of the reactor is significantly lowered in activity by the deposition of metals, and that as the outlet is approached, the lowering in activity due to the deposition of metals tends to become smaller. As described above, the quantity of metals deposited on the catalyst varies depending on the position of the catalyst in the reactor. Accordingly, it is necessary that the hydrotreating catalyst to be packed into some space in the reactor is one having a suitable metal resistance (property of inhibiting the lowering in activity due to the deposition of metals) depending on the position of the space. Additionally, it has been found that the metal resistance (N) of a hydrotreating catalyst can be represented by functions of the surface area (SA) of the catalyst and the pore volume (PV) thereof as shown by the following equation, wherein E is n constant, and f and g are functions wherein SA and PV are variables respectively.

$$N=f(PV)/g(SA)-E \qquad (3)$$

On the other hand, the quantity of coke deposited was largest at the outlet of the reactor and became smaller toward the inlet thereof. That is, it has been found that the catalyst near the outlet is significantly lowered in activity by the deposition of coke, and that as the inlet is approached, the lowering in activity due to the deposition of coke tends to become smaller. As described above, the quantity of coke deposited on the catalyst varies depending on the position of the catalyst in the reactor. Accordingly, it is necessary that the hydrotreating catalyst to be packed into some square in the reactor is one having a suitable coke resistance (property of inhibiting the lowering in activity due to the deposition of coke) depending on the position of the space. Additionally, it has been found that the coke resistance (K) of a hydrotreating catalyst can be represented by the following equation, wherein D is a constant, and h and j are functions wherein SA and PV are variables respectively.

$$K=h(SA)-j(PV)-D \qquad (4)$$

Additional detailed studies were made on the mechanism how the activity of a hydrotreating catalyst is lowered, and as a result of the studies, it has been found that the desulfurization reaction and the demetallization reaction can be represented by the following equations, when the activity lowering functions of desulfurization and demetallization are defined as $\phi s=Ls(M, C)$ and $\phi m=Lm(M, C)$ respectively, wherein M is the quantity of metals deposited on the catalyst and C is that of coke deposited thereon. In the following formulae, $PH_2$ is a partial pressure of hydrogen.

$$\text{desulfurization: } dCs/dt=Qs(\phi s, Cs, PH_2) \qquad (5)$$

$$\text{demetallization: } dCm/dt=Qm(\phi m, Cm, PH_2) \qquad (6)$$

The reactor to be used in the process of this invention contains a plurality of hydrotreating catalyst layers. The reactor includes fixed bed ones and fluidized bed ones. In this invention, a fixed bed reactor is preferably used because the reactor permits easy partition among the catalyst layers and easy operation of the equipment.

In this invention, the number of hydrotreating catalyst layers is 4 or more, preferably 4 to 20, still preferably 5 to 15. In this invention, the first catalyst layer is provided on the inlet side (oil feeding side) of the reactor, and several catalyst layers are further provided toward the outlet successively, with the last catalyst layer being provided on the outlet side.

According to this invention, the hydrotreating of a heavy oil is conducted by passing the oil through the first to the last catalyst layers successively to thereby bring the oil into contact with hydrogen gas under hydrogenation conditions in each catalyst layer.

When a fixed bed reactor is used, the contact of a heavy oil with hydrogen gas may be conducted by a cocurrent, descending or ascending flow method or a countercurrent method. When a fluidized bed reactor is used, the contact may be conducted by a cocurrent ascending flow method.

In this invention, the reactor may be equipped in spaces among the catalyst beds with a nozzle for feeding a quench oil or a quench gas for the temperature control of the reactor and/or with a nozzle for replenishing hydrogen gas.

According to this invention, the first to last catalyst layers may be packed into one reactor, or they may be separately packed into a plurality of reactors respectively.

The feed oil to be used in the hydrotreating according to this invention is a heavy oil, which contains sulfur compounds, metallic components. Examples of the heavy oil are atmospheric distillation residues of crude oils: vacuum distillation residues obtained by vacuum distillation of atmospheric distillation residues; oils prepared from tar sand, oil sand and bitumen through extraction and reforming; heavy oils prepared from these oils through desulfurization; deasphalted oil; heavy crude oils; heavy crude oils diluted with naphtha, kerosene, gas oil and vacuum gas oil; and mixed oils of two or more of them.

It is preferable that the lower limit of sulfur content of the heavy oil to be used in this invention be 0.05% by mass, still preferably 0.3% by mass, and the upper limit thereof be 10% by mass, still preferably 6.0% by mass.

The term "sulfur content" used in this specification refers to one determined according to "G. Radiation Excitation Method" of "Testing Methods for Sulfur in Crude Oil and Petroleum Products" as stipulated in JIS K 2541-1992. All of the sulfur content values given in this specification are ones thus determined. Further, the term "metal content" used in this specification refers to one determined with, e.g., a fluorescent X-ray elemental analyser (trade name: MESA, mfd. by HORIBA SEISAKUSHO Co., Ltd.).

With respect to the metal content of the heavy oil to be used in this invention, the lower limit of the Ni content is preferably 0 ppm, still preferably 0.5 ppm, and the upper limit thereof is preferably 300 ppm, still preferably 250 ppm, while the lower limit of the V content is preferably 0 ppm, still preferably 1 ppm, and the upper limit thereof is preferably 3400 ppm, still preferably 1000 ppm.

The hydrotreating catalysts to be used in this invention may be hydrogenation catalysts which are selected from ones conventionally used for the hydrotreating of petroleum and whose physical properties (including surface area, pore volume) satisfy the requirements of this invention. This invention is not limited in the kind of hydrotreating catalysts at all.

The hydrotreating catalysts to be used in this invention each comprises a hydrogenation activating metal and a carrier of a porous inorganic oxide supporting the metal. Examples of the carrier are alumina, silica, titania, zirconia, magnesia, alumina-silica, alumina-boria, alumina-titania, alumina-zirconia, alumina-magnesia, alumina silica-zirconia, alumina-silica-titania, various zeolites, and various clay minerals such as sepiolite and montmorillonite. In this invention, it is preferable to use one or more members selected from these porous inorganic oxides.

The hydrogenation activating metal includes Group IB metals of the periodic table (such as copper), Group VB metals thereof (such as vanadium), Group VIB metals thereof (such as chromium, molybdenum, and tungsten), and Group VIII metals thereof (such as iron, cobalt and nickel).

One or more members selected from these activating metals are favorably used in this invention. In particular, it is preferable to use one or more hydrogenation activating metals selected from among cobalt, molybdenum, nickel and tungsten. Preferable examples of the combination of two metals are cobalt-molybdenum, nickel-molybdenum and nickel-tungsten.

A combination of three hydrogenation activating metals such as nickel-cobalt-molybdenum or tungsten-cobalt-nickel is excellent in hydrodesulfurizing activity and sulfur resistance, thus being preferably usable.

The lower limit of the amount of the hydrogenation activating metal supported may be preferably 1% by mass, still preferably 2% by mass based on the total amount of the catalysts, while the upper limit thereof may be preferably 40% by mass, still preferably 30% by mass based thereon. With respect to the hydrotreating catalyst to be used in each catalyst layer, the metal and the amount thereof supported may be selected arbitrarily.

It is preferable that the hydrogenation activating metal component be supported in the form of an oxide and/or a sulfide thereof. The metal component can be supported by an impregnation method of immersing a carrier in a solution of a soluble salt of the metal component to thereby introduce the metal component into the carrier, a coprecipitation method of precipitating the metal component during the preparation of a carrier, or the like. Any other methods may be used. In particular, the impregnation method is advantageous in that the operation is easy and simple and that the physical properties of the catalyst obtained are guaranteed. The impregnation can be conducted by immersing a carrier in the above solution at ordinary temperature or above and keeping the resulting system under such conditions as to attain satisfactory impregnation of the carrier with the desired component. When two or more metal components are required to be supported on the carrier, the impregnation may be conducted by a one fluid impregnation method (comprising mixing the two or more metal components with each other and immersing a carrier in a solution of the mixture to make the carrier impregnated with the metal components simultaneously), a two-fluid impregnation method (comprising separately preparing solutions which contain two or more metal components respectively and immersing a carrier in the solutions successively), or the like.

The conditions of the hydrotreating (contact of a heavy oil with the hydrotreating catalysts) will now be described. The lower limit of the reaction temperature may be preferably 300° C., still preferably 350° C., while the upper limit thereof may be preferably 480° C., still preferably 440° C.

When the reaction temperature is less than 300° C., neither desulfurization nor the demetallization will sufficiently proceed, while when it exceeds 480° C., overcracking will occur, so that the equipment will be problematic in heat resistance unfavorably.

In the hydrotreating according to this invention, the lower limit of the partial pressure of hydrogen at the inlet of the reactor may be preferably 1.0 MPa, still preferably 8.0 MPa, while the upper limit thereof may be preferably 25.0 MPa, still preferably 19.0 MPa. When the partial pressure of hydrogen at the inlet is less than 1.0 MPa, no satisfactory catalytic activity will be exhibited, so that the desulfurization for producing an ultralow sulfur heavy oil will not satisfactorily be conducted.

On the contrary, when the partial pressure exceeds 25.0 MPa, the equipment will be problematic in pressure resistance. On the other hand, the partial pressure of hydrogen at the outlet of the reactor depends on the depth of the reaction, and therefore is difficult to limit. However, the partial pressure of hydrogen at the outlet may be made equal to that at the inlet by feeding hydrogen gas generally into spaces among the catalyst layers.

The lower limit of the liquid hourly space velocity (LHSV) of feed heavy oil may be preferably 0.02 h$^{-1}$, still preferably 0.05 h$^{-1}$, and the upper limit thereof may be preferably 10.0 h$^{-1}$, still preferably 1.0 h$^{-1}$, though the lower and upper limits are not particularly restricted.

In the hydrotreating according to this invention, the lower limit of the hydrogen/oil ratio at the inlet of the reactor may be preferably 100 Nm$^3$/m$^3$, still preferably 500 Nm$^3$/m$^3$, and the upper limit thereof is preferably 2000 Nm$^3$/m$^3$, still preferably 1600 Nm$^3$/m$^3$. When the hydrogen/oil ratio is less than 100 Nm$^3$/m$^3$, the reaction will not proceed satisfactorily, while when it exceeds 2000 Nm$^3$/m$^3$, only a small amount of oil will be hydrotreated.

The amount of the catalyst packed into each catalyst layer may be preferably 3 to 70% by volume, still preferably 5 to 60% by volume based on the total amount of the catalysts packed into the reactor. The amount of the catalyst to be packed into each catalyst layer may be selected arbitrarily. When the amount is less than 3% by volume, the desulfurization or the demetalization will be unsatisfactory, while when it exceeds 70% by volume, the amount of the catalysts packed into the other layers will be so small that the advantageous effect attained will also be poor unfavorably.

The ultralow sulfur heavy oils produced according to this invention can be used per se as product fuel oils. Alternatively, they may be used as product fuel oils in the form of mixtures with distillation residues of petroleum, kerosenes, straight run gas oils, vacuum gas oils, gas oils and residues obtained by thermal cracking of distillation residues of petroleum, oils obtained by hydrotreating them, light gas oils (light cycle oils), heavy gas oils (heavy cycle oils) and slurry oils each obtained from catalytic cracking plants, or other base oils for fuel oils.

EXAMPLE 1

The properties of feed heavy oil and the conditions of hydrotreating are as follows: Properties of feed heavy oil Heavy oil (atmospheric distillation residue of Arabian Heavy)

| | |
|---|---|
| Specific gravity (15/4° C.) | 0.9795 |
| Sulfur content (wt %) | 3.96 |
| Nitrogen content (wt %) | 0.41 |
| Carbon residue (wt %) | 15.0 |
| Asphaltene (wt %) | 7.30 |
| Ni (ppm) | 30 |
| V (ppm) | 110 |
| Conditions of hydrotreating | |
| Partial pressure of hydrogen (MPa) | 10.3 |
| Reaction temperature (° C.) | 70 to 390 |
| Liquid hourly space velocity (LUSV) (hr$^{-1}$) | 0.17 |
| Hydrogen/oil ratio (l/l-oil) | 700 |

Catalysts used

The hydrotreating catalysts A to F having physical properties specified in Table 1 were prepared and packed into catalyst layers respectively in amounts specified in Table 2.

Hydrotreating catalysts A to F carrier: alumina metal components supported: MoO$_3$, NiO

TABLE 1

| Catalysts | Surface area m$^2$/m$^3$ | Pore volume m$^3$/m$^3$ |
|---|---|---|
| catalyst A | 9.91 × 10$^7$ | 3.98 × 10$^{-1}$ |
| catalyst B | 1.08 × 10$^8$ | 3.65 × 10$^{-1}$ |

TABLE 1-continued

| Catalysts | Surface area m²/m³ | Pore volume m³/m³ |
|---|---|---|
| catalyst C | $1.13 \times 10^8$ | $4.12 \times 10^{-1}$ |
| catalyst D | $1.40 \times 10^8$ | $3.95 \times 10^{-1}$ |
| catalyst E | $1.44 \times 10^8$ | $3.83 \times 10^{-1}$ |
| catalyst F | $1.85 \times 10^8$ | $3.91 \times 10^{-1}$ |

TABLE 2

| Catalyst layers | Catalysts | Packing volume vol % |
|---|---|---|
| 1st catalyst layer | catalyst A | 10 |
| 2nd catalyst layer | catalyst B | 10 |
| 3rd catalyst layer | catalyst C | 10 |
| 4th catalyst layer | catalyst D | 10 |
| 5th catalyst layer | catalyst E | 30 |
| 6th catalyst layer | catalyst F | 30 |

COMPARATIVE EXAMPLE 1

The properties of feed heavy oil and conditions of hydrotreating were the same as those of Example 1.
Catalysts used
Hydrotreating catalysts G to I having physical properties specified in Table 3 were prepared and packed into catalyst layers in amounts specified in Table 4.
Hydrotreating catalysts G to I
carrier: alumina
metal components supported: MoO₃, NiO

TABLE 3

| Catalysts | Surface area m²/m³ | Pore volume m³/m³ |
|---|---|---|
| catalyst G | $9.91 \times 10^7$ | $3.98 \times 10^{-1}$ |
| catalyst H | $1.13 \times 10^8$ | $4.12 \times 10^{-1}$ |
| catalyst I | $1.44 \times 10^8$ | $3.83 \times 10^{-1}$ |

TABLE 4

| Catalyst layers | Catalysts | Packing volume vol % |
|---|---|---|
| 1st catalyst layer | catalyst G | 20 |
| 2nd catalyst layer | catalyst H | 20 |
| 3rd catalyst layer | catalyst I | 60 |

Figure 1:
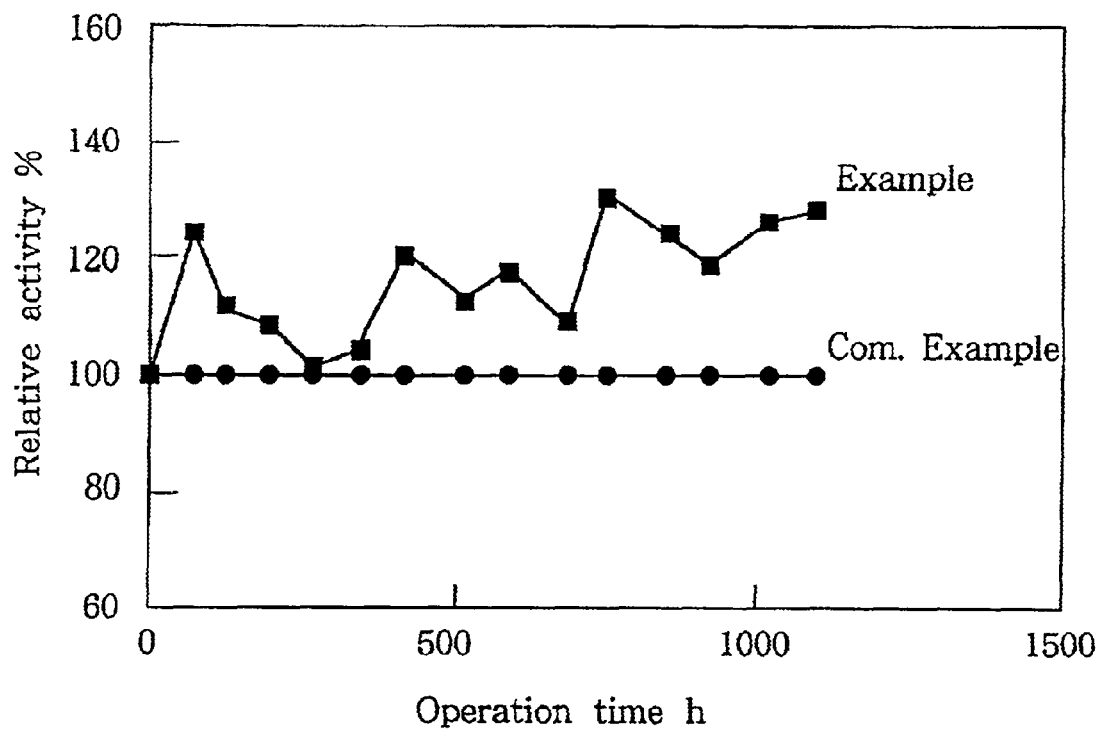
FIG. 1 is a graph showing the results of the evaluation of hydrotreating catalysts of Example and Comparative Example for desulfurizing activity.

FIG. 1 shows the results of the evaluation for desulfurizing activity as observed in the hydrotreating of Example 1 and Comparative Example 1 (in terms of relative activities as calculated by taking the activity of Comparative Example as 100).

As shown in FIG. 1, the catalyst system of Example 1 exhibited an evidently higher activity than that of the system of Comparative Example 1. After the lapse of 700 hours, the difference in activity between the catalyst systems tends to widen with the lapse of time. Thus, it is apparent that the catalyst system of Example 1 composed for four or more catalyst layers packed respectively with hydrotreating catalysts satisfying the specific requirements exhibits an enhanced activity over a prolonged period as compared with the catalyst system of Comparative Example 1 composed of three catalyst layers packed respectively with hydrotreating catalysts satisfying the same requirements.

The reactor for hydrotreating according to this invention exhibits a total desulfurizing activity higher than that of the reactor according to the prior art, and the high desulfurizing the demetalizing activities can be retained for a prolonged period. Accordingly, the use of the reactor according to this invention makes it possible to produce over a long period of time a large quantity of an ultralow sulfur heavy oil from a heavy oil that is advantageous in industrial practice.

What is claimed is:

1. A reactor for hydrotreating, which comprises at least four catalyst layers packed respectively with hydrotreating catalysts, with said layers satisfying the relationship represented by the following formulae:

$$S_n \leq S_{n+1} \quad (1)$$

$$1.15 V_n \geq V_{n+1} \quad (2)$$

wherein S represents the surface area per cubic meter of each hydrotreating catalyst layer; V represents the pore volume per cubic meter of each catalyst layer; and wherein n is a natural number representing the order of each catalyst layer, and with an amount of the catalyst packed into each catalyst layer being 3 to 70% by volume based on the total amount of the catalysts packed into the reactor.

2. The reactor according to claim 1, wherein the reactor comprises 4 to 20 catalyst layers.

3. The reactor according to claim 1, wherein the reactor comprises 5 to 15 catalyst layers.

4. The reactor according to claim 1, wherein the hydrotreating catalysts contain a hydrogenation activating metal and a carrier of a porous inorganic oxide supporting the metal.

5. The reactor according to claim 4, wherein the hydrogenation activating metal is at least one member selected from the group consisting of group IB metals, group VB metals, group VIB metals and group VIII metals.

6. The reactor according to claim 4, wherein the hydrogenation activating metal is at least one member selected from the group consisting of cobalt, molybdenum, nickel and tungsten.

7. The reactor according to claim 4, wherein the porous inorganic oxide is at least one member selected from the group consisting of alumina, silica, titania, zirconia, magnesia, alumina-silica, alumina-boria, alumina-titania, alumina-zirconia, alumina-magnesia, alumina-silica-zirconia, alumina-silica-titania, zeolites, sepiolite and montmorillonite.

8. The reactor according to claim 4, wherein an amount of the hydrogenation activating metal supported is 1 to 40% by mass based on the total amount of the catalyst.

9. The reactor according to claim 4, wherein the porous inorganic oxide is at least one member selected from the group consisting of silica, titania, zirconia, magnesia, alumina-silica, alumina-boria, alumina-titania, alumina-zirconia, alumina-magnesia, alumina-silica-zirconia, alumina-silica-titania, zeolites, sepiolite and montmorillonite.

10. The reactor according to claim 1, wherein the reactor further comprises in spaces among catalyst beds a nozzle for feeding a quenching oil or a quenching gas for temperature control of the reactor.

11. A process for producing an ultralow sulfur heavy oil, which comprises using a reactor for hydrotreating which contains at least four catalyst layers packed respectively with hydrotreating catalysts, with said layers satisfying the relationship represented by the following formulae:

$$S_n \leq S_{n+1} \quad (1)$$

$$1.15 V_n \geq V_{n+1} \quad (2)$$

wherein S represents the surface area per cubic meter of each hydrotreating catalyst layer; V represents the pore volume per cubic meter of each hydrotreating layer; and wherein n is a natural number representing the order of each catalyst layer, and with an amount of the catalyst packed into each catalyst layer being 3 to 70% by volume based on the total amount of the catalysts packed into the reactor, and passing a heavy oil through the first to the last catalyst layers successively to thereby bring the heavy oil into contact with hydrogen gas under hydrogenation conditions in each catalyst layer.

12. The process according to claim 11, wherein the reactor comprises 4 to 20 catalyst layers.

13. The process according to claim 11, wherein the hydrogenation conditions include the reaction temperatures of 300 to 480° C.

14. The process according to claim 11, wherein the partial pressures of hydrogen at the inlet of the reactor range from 1.0 to 25.0 MPa.

15. The process according to claim 11, wherein the hydrogen/oil ratios at the inlet of the reactor range from 100 to 2000 $Nm^3/m^3$.

16. The process according to claim 11, wherein the process further comprises feeding a quenching oil or a quenching gas for temperature control of the reactor into spaces among catalyst beds.

17. The process according to claim 11, wherein the first to the last catalyst layers are separately packed into a plurality of reactors, respectively.

18. The process according to claim 11, wherein the contact of a heavy oil with hydrogen gas is conducted by a method selected from the group consisting of a cocurrent descending flow method, a cocurrent ascending flow method and a countercurrent method.

19. The process according to claim 11, wherein the hydrotreating catalysts contain a hydrogenation activating metal and a carrier of a porous inorganic oxide supporting the metal and wherein the porous inorganic oxide is at least one member selected from the group consisting of silica, titania, zirconia, magnesia, alumina-silica, alumina-boria, alumina-titania, alumina-zirconia, alumina-magnesia, alumina-silica-zirconia, alumina-silica-titania, zeolites, sepiolite and montmorillonite.

20. A reactor for hydrotreating, which comprises at least six catalyst layers packed respectively with a hydrotreating catalyst, with said layers satisfying the relationship represented by the following formulae:

$$S_n \leq S_{n+1} \quad (1)$$

$$1.15 V_n > V_{n+1} \quad (2)$$

wherein S represents the surface area per cubic meter of each hydrotreating catalyst layer; V represents the pore volume per cubic meter of each catalyst layer; and n is a natural number representing the order of each catalyst layer, and with an amount of the catalyst packed into each catalyst layer being 3 to 70% by volume based on the total amount of the catalysts packed into the reactor, and wherein the hydrotreating catalyst consists of, as metal components, $MoO_3$ and NiO supported on an alumina carrier.

21. A process for producing an ultralow sulfur heavy oil, which comprises using a reactor for hydrotreating which contains at least six catalyst layers packed respectively with a hydrotreating catalyst, with said layers satisfying the relationship represented by the following formulae:

$$S_n \leq S_{n+1} \quad (1)$$

$$1.15 V_n \geq V_{n+1} \quad (2)$$

wherein S represents the surface area per cubic meter of each hydrotreating catalyst layer; V represents the pore volume per cubic meter of each catalyst layer; and wherein n is a natural number representing the order of each catalyst layer, and with an amount of the catalyst packed into each catalyst layer being 3 to 70% by volume based on the total amount of the catalysts packed into the reactor, and passing a heavy oil through the first to the last catalyst layers successively to thereby bring the heavy oil into contact with hydrogen gas under hydrogenation conditions in each catalyst layer, and wherein the hydrotreating catalyst consists of, as metal components, $MoO_3$ and NiO supported on an alumina carrier.

* * * * *